US006424375B1

(12) United States Patent
Fowler

(10) Patent No.: US 6,424,375 B1
(45) Date of Patent: Jul. 23, 2002

(54) LOW NOISE ACTIVE RESET READOUT FOR IMAGE SENSORS

(75) Inventor: Boyd Fowler, Sunnyvale, CA (US)

(73) Assignee: Pixel Devices, International, Sunnyvale, CA (US)

( * ) Notice: Subject to any disclaimer, the term of this patent is extended or adjusted under 35 U.S.C. 154(b) by 0 days.

(21) Appl. No.: 09/400,789

(22) Filed: Sep. 21, 1999

(51) Int. Cl.$^7$ ............................ H04N 5/217; H01J 40/14
(52) U.S. Cl. ............................ 348/241; 250/214 R
(58) Field of Search ......................... 348/241; 327/514, 327/515; 358/463; 250/214 C, 214.1, 208.1, 214 A, 214 R

(56) References Cited

U.S. PATENT DOCUMENTS

| 3,836,793 A | * | 9/1974 | Haitz et al. ................. 327/514 |
| 4,523,231 A | * | 6/1985 | Therrien ..................... 348/187 |
| 5,121,214 A | * | 6/1992 | Turko et al. ................. 348/249 |
| 5,194,727 A | * | 3/1993 | Johnson et al. .......... 250/214 R |

FOREIGN PATENT DOCUMENTS

| GB | 2269010 | * | 1/1994 | ............. G01J/1/44 |
| JP | 61-147680 | * | 7/1986 | ........... H04N/5/335 |

OTHER PUBLICATIONS

B. Pain et al. "Analysis and enhancement of low–light performance of photodiode–type CMOS active pixel imagers operated with sub–threshold reset" in 1999 IEEE Workshop of CCDs and AIS, Nagano, Japan, Jun. 1999.

H. Tian et al. "Analysis of Temporal Noise CMOS APS" in Proceedings of SPIE vol. 3649, San Jose, CA, Jan. 1999.

O. Yadid–Pecht et al. "Optimization of Noise and Responsitivity in CMOS Active Pixel Sensor for Detection of Ultra Low Light Levels" in Proceedings of SPIE vol. 3019, San Jose, CA, Feb. 1997.

S.K. Mendis et al. "Progress in CMOS Active Pixel Image Sensors" in Proceedings of SPIE vol. 2172, San Jose, CA, Feb. 1994.

A. El Gamal et al. "Modeling and Estimation of FPN Components in CMOS Image Sensors" in Proceedings of SPIE vol. 3301, San Jose, CA, Jan. 1998.

T. Nobusada et al. "Frame Interline Transfer CCD Sensor for HDTV Camera" in ISSCC Digest of Technical Papers, San Francisco, CA, Feb. 1989.

M. Tartagni et al. 1989 "A Fingerprint Sensor Based on the Feedback Capacitive Sensing Scheme" IEEE J. of Solid State Circuits 33(1):133–142.

* cited by examiner

Primary Examiner—Wendy R. Garber
Assistant Examiner—Luong Nguyen
(74) Attorney, Agent, or Firm—Calvin B. Ward

(57) ABSTRACT

Bandlimiting and capacitive feedback is used to reduce pixel reset noise in an image sensor without adding lag. An image sensor includes a reset circuit having a reset control loop for controlling pixel reset. The reset control loop includes, for example, a reset amplifier and a transistor. The reset amplifier has a first input coupled to a reset voltage and a second input coupled to a readout node (e.g., the source of a NMOS transistor). When the reset voltage exceeds the readout node voltage, the reset amplifier output voltage rises and turns on the transistor. The output voltage of the transistor then follows the reset voltage until the reset voltage stops rising and the readout node voltage overshoots the reset voltage. After the readout node voltage overshoots the reset voltage, the reset amplifier output voltage drops and turns the transistor off. With the transistor off, only the overlap capacitance of the transistor is used to control the reset control loop[. The overlap capacitance is combined with pixel capacitance to form a capacative voltage divider in the reset control loop for reducing pixel reset noise at the readout node. When the reset voltage is returned to ground or other suitable reference, the pixel reset is complete.

13 Claims, 9 Drawing Sheets

FIGURE 1    100

LOW NOISE ACTIVE RESET READOUT FOR IMAGE SENSORS

FIELD OF THE INVENTION

The invention is related to image sensors, and more particularly, to reducing pixel reset noise in image sensors.

BACKGROUND OF THE INVENTION

In image sensor applications, it is becoming increasingly important to integrate the image sensor with other circuitry for driving the image sensor and for performing on-chip signal processing. Ideally, the integration of on-chip circuitry with image sensors should provide good imager performance with low-noise, no lag or smear, good blooming control, random access, simple clocks, and fast readout rates.

To meet these requirements, image sensors compatible with on-chip circuit technology, such as Complementary Metal-oxide Semiconductor (CMOS) technology, have been developed. One previously demonstrated CMOS compatible technology is active pixel sensor (APS) technology, which includes: amplified MOS image (AMI), charge modulation device (CMD), bulk charge modulated device (BCMD), and base stored image sensor (BASIS). Although AMI is compatible with CMOS, the device suffers from high noise and lag problems making it unsuitable for high resolution applications. CMD, BCMD, and BASIS can be made compatible with CMOS technology, but these devices typically require additional fabrication steps thereby making it difficult for such devices to successfully compete against charge-coupled-devices (CCDs); the dominant technology for image sensors. See, e.g., S. Mendis et al., "Progress in CMOS Active Pixel Image Sensors," in *Proceedings of SPIE*, pp. 1–2, (San Jose, Calif.), February 1994.

Noise in CMOS image sensors is typically much larger than noise in CCDs. The noise can be categorized as either fixed pattern or temporal. Fixed pattern noise can be eliminated by using pixel-to-pixel offset and gain correction. On the other hand, temporal noise typically cannot be removed after it is added to image data. Thus, techniques for reducing temporal noise in CMOS image sensors must be developed.

Temporal noise in standard APS is well understood. The largest temporal noise component is contributed by resetting the pixel, and is on the order of $$\frac{kT}{c}.$$

In a CCD, temporal reset noise can be eliminated by using correlated double sampling (CDS), as described in T. Nobusada et al., "Frame Interline CCD Sensor for HDTV Camera," in ISSCC *Digest of Technical Papers* (San Francisco, Calif., USA), February 1989. Unfortunately, due to size limitations, pixel level CDS cannot be used in APS.

More recently, a technique was developed that reduces temporal reset noise to $$\frac{kT}{2c}$$

without the addition of lag. See B. Pain et al., "Analysis and Enhancement of Low-light-level Performance of Photodiode-type CMOS Active Pixel Images Operated With Sub-threshold Reset," in 1999 *IEEE Workshop on CCDs and AIS*, (Nagano, Japan), June 1999. Although this technique significantly reduces temporal reset noise, more noise reduction is needed for CMOS image sensors to successfully compete with CCDs in the market.

Accordingly, there is a need for a pixel reset circuit and method for reducing pixel reset noise in image sensors to improve image clarity. Such a circuit and method should reduce pixel reset noise without adding lag, and be directly applicable to existing APS designs.

SUMMARY OF THE INVENTION

The present invention is directed to reducing pixel reset noise in image sensors without adding lag. An image sensor (e.g., APS) having active reset readout includes a circuit for resetting a pixel device. The reset circuit includes a switch coupled to a readout node for resetting the pixel device. A compare module is coupled to the switch, the readout node, and a reset signal for turning the switch on and off in response to a difference detected between the reset signal and a readout signal from the readout node. The capacitance in the circuit is coupled to reduce noise in the readout signal.

A method of the present invention includes providing low noise readout from a pixel device in an image sensor. The image sensor includes a reset circuit having a reset control loop for controlling the reset of the pixel device. The reset control loop preferably includes a compare module and a switch. The compare module has a first input for receiving a reset signal and a second input for receiving a feedback signal from a readout node. The readout node is coupled to outputs of the switch and pixel device, respectively. The method comprises the steps of: (a) comparing the reset signal with the feedback signal; (b) turning the switch on and off in response to a difference detected between the reset signal and the feedback signal; and (c) controlling the reset control loop with capacitance in the reset control loop in response to the switch turning off, wherein the feedback signal reduces noise at the readout node.

In the preferred embodiment of the present invention, the reset control loop includes a reset amplifier and a transistor. The reset amplifier has a first input coupled to a reset voltage and a second input coupled to a readout node (e.g., the "source" of the transistor). When the reset voltage exceeds the readout node voltage, the reset amplifier output voltage rises and turns on the transistor. After turning on the transistor, the output voltage of the transistor follows the reset voltage until the reset voltage stops rising and the readout node voltage overshoots the reset voltage. After the readout node voltage overshoots the reset voltage, the reset amplifier output voltage drops and turns the transistor off. With the transistor off, only overlap capacitance of the transistor is used to control the reset control loop. The overlap capacitance is combined with pixel capacitance to form a capacative voltage divider in the reset control loop for reducing pixel reset noise at the readout node. When the reset voltage is returned to ground or other suitable reference, the pixel reset is complete.

An advantage of the present invention is the use of bandlimiting and capacitive feedback to reduce pixel reset noise in image sensors without adding lag. By reducing pixel reset noise, the fundamental detection limit of the pixel is increased resulting in improved image clarity. The present invention can be applied directly to existing APS designs with minimal design changes.

DETAILED DESCRIPTION OF THE PREFERRED EMBODIMENTS

The term "pixel" or "pixel device" as used herein means a device for detecting light and/or converting light into an electrical signal, including, for example, photodiodes and phototransistors. While the present invention is described with respect to CMOS APS, the present invention is applicable to any image sensor that resets a capacitor in a capacitive sensing scheme, including, e.g., the sensor described in M. Tartagni et al., "A Fingerprint Sensor Based on the Feedback Capacitive Sensing Scheme," in *IEEE Journal of Solid-state Circuits,* Vol. 33, No. 1, January 1998, the relevant portions of which are incorporated herein by reference.

Figure 1:
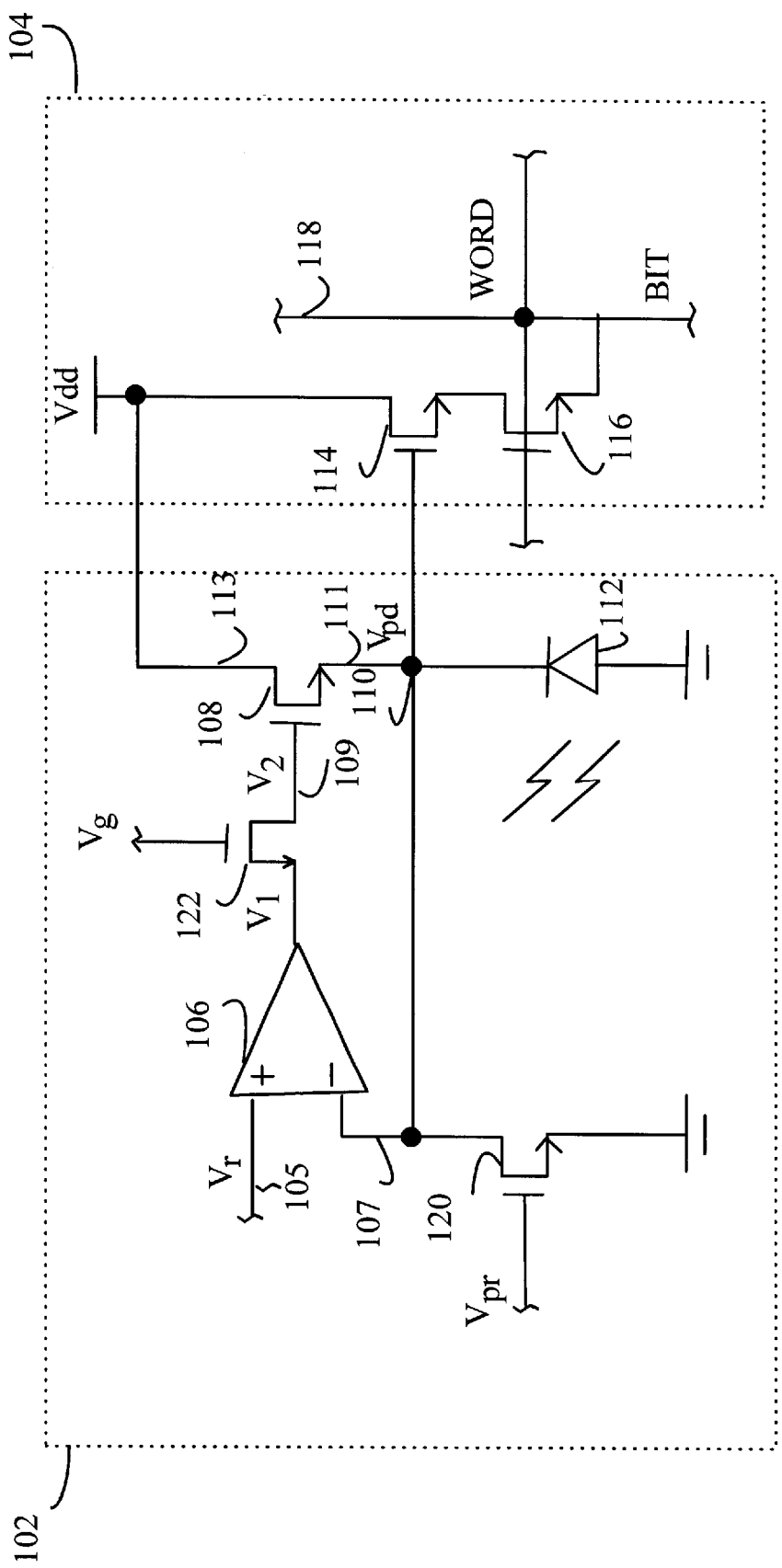
FIG. 1 is a circuit schematic of one embodiment of an APS having active reset readout in accordance with the present invention.

Referring to FIG. 1, there is shown a schematic of one embodiment of an APS 100 having active reset readout in accordance with the present invention. The APS 100 includes two circuits: a reset circuit 102 and a readout circuit 104.

The readout circuit 104 includes transistors 114, 116 for buffering signals at readout node 110. The readout node 110 provides a readout signal or voltage (hereinafter also referred to as "$v_{pd}$") that is transferred by the readout circuit 104 to bus 118. The operation and noise characteristics of the readout circuit 104 are described in the following references, the relevant portions of which are incorporated herein by reference: S. Mendis et al., "Progress in CMOS Active Pixel Image Sensors," in *Proceedings of SPIE,* pp. 19–29, (San Jose, Calif.), February 1994; O. Yadid-Pecht, et al. "Optimization of Noise and Responsivity in CMOS Active Pixel Sensor for Detection of Ultra Low Light Levels," in *Proceedings of SPIE,* vol. 3019, (San Jose, Calif.), January 1997; and H. Tian et al., "Analysis of Temporal Noise CMOS APS," in *Proceedings of SPIE,* vol. 3649 (San Jose, Calif.), January 1999.

The reset circuit 102 includes a compare module 106 and a switch 108 coupled together in a closed-loop feedback arrangement (hereinafter also referred to as "the reset control loop"). In this preferred embodiment, the compare module 106 is a differential amplifier (e.g., 741 op-amp) and the switch 108 is an NMOS transistor. Alternatively, the compare module 106 can be implemented with a conventional voltage comparator circuit or other functionally similar electronic circuit that operates upon the difference between two signals (e.g., voltage, current, phase change). The compare module 106 and the switch 108 can be implemented with a variety of semiconductor technologies and/or electronic circuits (e.g., PMOS, BiCMOS, silicon bipolar technology, Gallium Aresenide (GaAs) technology, and Josephson junction technology). The reset circuit 102 and readout circuit 104 can be built using any one of a plurality of semiconductor fabrication processes (e.g., 0.35 micron CMOS process), or can be implemented with discrete components, depending on the application.

The compare module 106 has at least two inputs and an output. A first input 105 is coupled to a reset voltage, $v_r$, for resetting a pixel device 112. The reset voltage, $v_r$, can be derived from a source internal or external to the APS 100. Alternatively, the pixel device 112 can be reset using a signal other than a voltage level (e.g., current level, phase change). A second input 107 to the compare module 106 is coupled to the readout node 110 and to switch 120 to provide a closed-loop feedback path for the reset circuit 102. In the preferred embodiment, the compare module 106 provides an output voltage, $v_g$, in response to a difference in voltage levels applied to the first and second inputs 105, 107 of the compare module 106.

The switch 108 has at least three terminals. A first terminal 109 is coupled to the output of the compare module 106 via a switch 122. A second terminal 111 is coupled to the readout node 110 and the pixel device 112 to complete the feedback loop to the compare module 106, as shown in FIG. 1. A third terminal 113 is coupled to a power source, $v_{dd}$, for providing power to the reset circuit 102. The power source, $v_{dd}$, can be located internal or external to the APS 100 depending on the application.

Reset Circuit Operation

The operation of reset circuit 102 is described below with reference to FIGS. 1 and 2, and is based on the preferred embodiment in FIG. 1, wherein the compare module 106 is reset amplifier 106, the switches 108, 120, 122 are NMOS transistors 108, 120, 122 and the pixel device 112 is photodiode 112. As shown in FIG. 1, the first, second, and third terminals of the switch 108 are, respectively, the "gate," "source," and "drain" terminals of the NMOS transistor, as commonly named in the relevant art.

Figure 2:
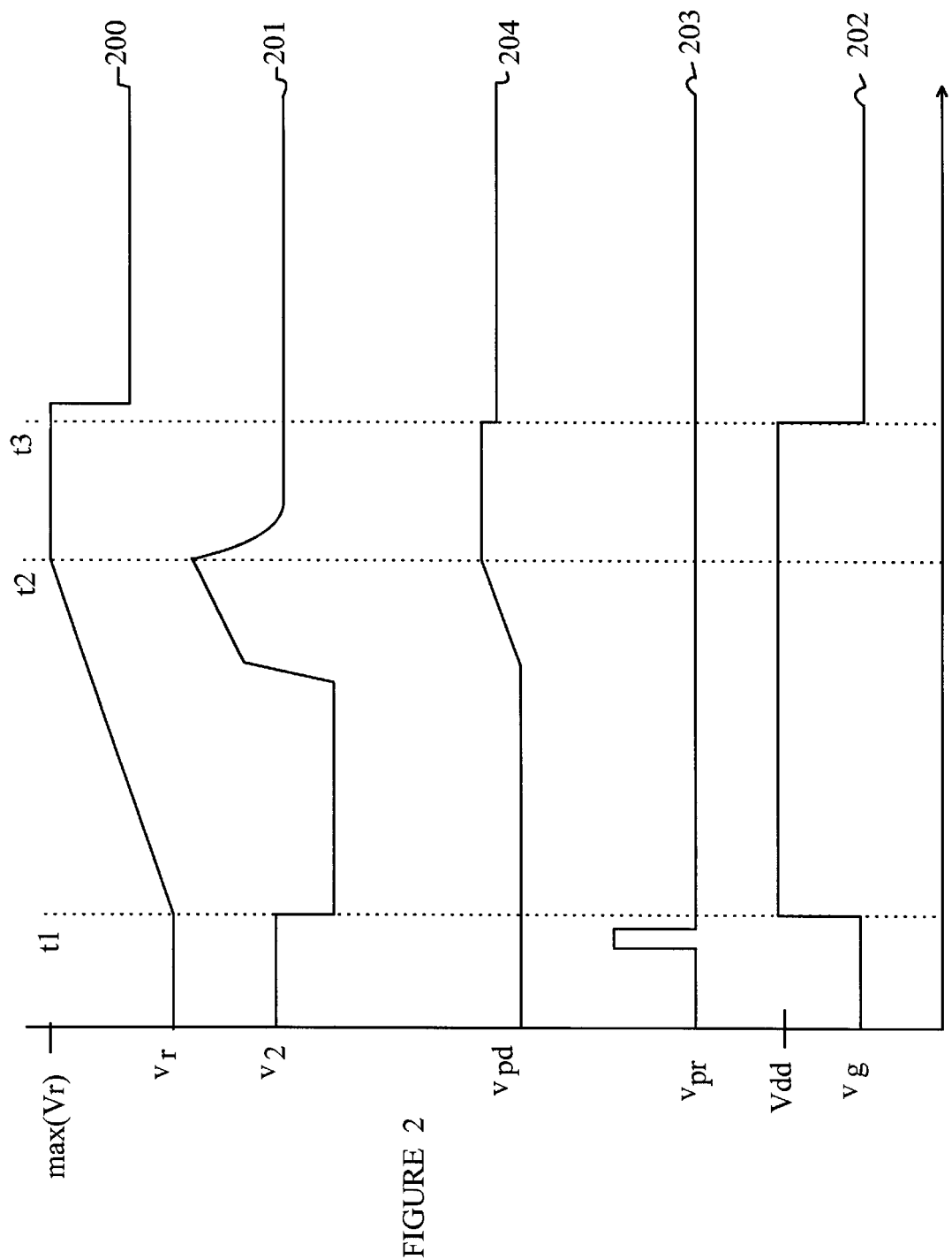
FIG. 2 is a plot illustrating reset waveforms for the APS in FIG. 1.

Referring to FIG. 2, there is shown plots of reset waveforms 200–204 for illustrating the operation of the reset circuit 102 in FIG. 1. The waveform 200 is a plot of the reset voltage, $v_r$, as a function of time t, the waveform 201 is a plot of the voltage, $v_2$ as a function of time t, the waveform 202 is a plot of the reset amplifier 106 output voltage, $v_g$, as a function of time t, the waveform 203 is a plot of the voltage $v_{pr}$ as a function of time t, and the waveform 204 is a plot of the readout node 110 voltage, $v_{pd}$, as a function of time t.

Just before time $t_1$, $v_g$ rises to $v_{dd}$ and turns on transistor 122. Then $v_{pr}$ pulses for approximately 100 ns and pulls $v_{pd}$ to ground. At time $t_1$, $v_r$ rises slowly (e.g., $\approx 0.2V/\mu s$) from ground to max($v_r$) at time $t_2$. When $v_r$ exceeds $v_{pd}$ the reset amplifier 106 output voltage, $v_g$, rises and turns on the transistor 108. Then $v_{pd}$ follows $v_r$ until $v_r$ stops rising, at time $t_2$, and $v_{pd}$ overshoots $v_r$. $v_{pd}$ overshoots $v_r$ because the transistor 108 can only pull voltage up. After $v_{pd}$ overshoots $v_r$, the output voltage, $v_1$, of the reset amplifier 106 drops and turns the transistor 108 off. Now only the overlap capacitance, $C_f$, of the transistor 108 is used to control $v_{pd}$ at the readout node 110. Therefore, if the reset control loop is allowed to reach a steady state, the transistor 108 does not contribute any reset noise to signals at the readout node 110. This significantly reduces the reset noise. Just before $t_3$, $v_g$ falls and turns off transistor 122. Finally at time $t_3$, $v_r$ is returned to ground or other suitable reference voltage and the reset of the photodiode 112 is complete.

Lag Analysis

Figure 3:
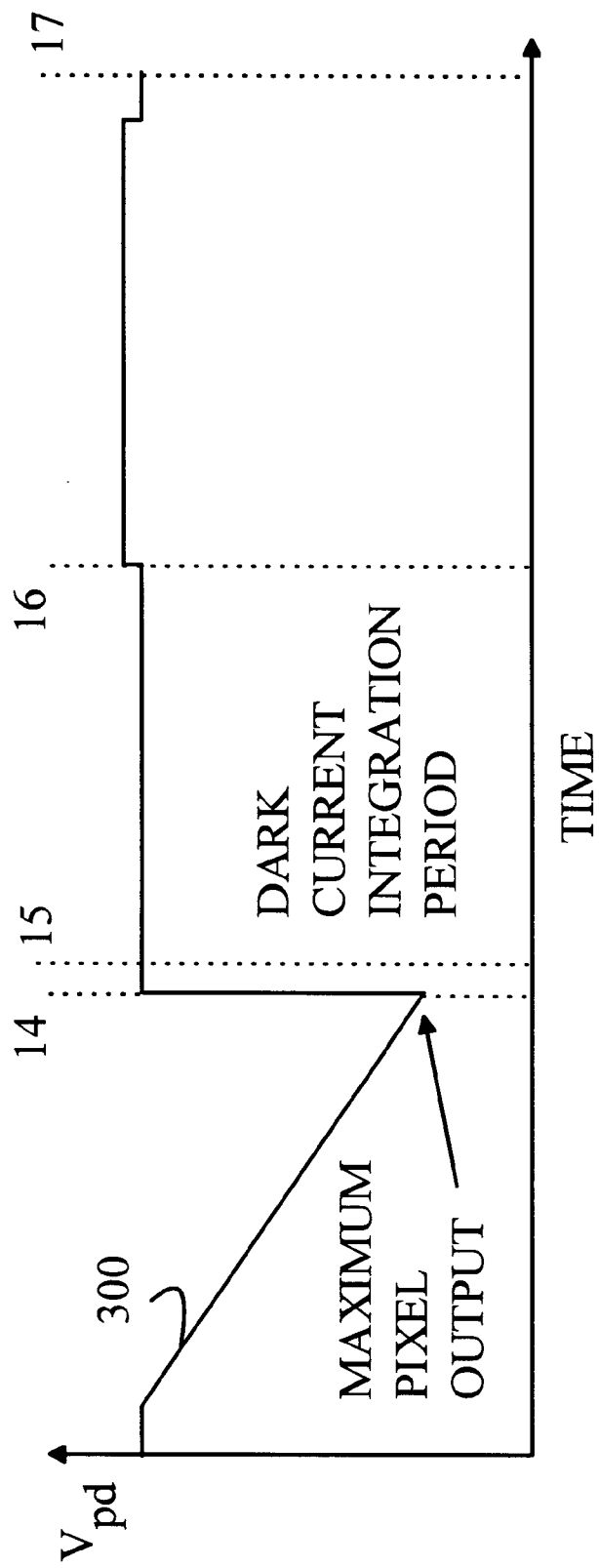
FIG. 3 is a plot of a waveform for defining lag for the APS in FIG. 1.

Referring to FIG. 3, there is shown a plot of a waveform 300 for defining lag in the reset circuit 102 in FIG. 1. Generally, lag measures the amount of residual photocharge or darkcharge left in the photodiode 112 after reset is complete. Using FIG. 3, maximum lag is defined as $$\max(lag) = \left| \frac{v_{pd}(t_5) - v_{pd}(t_7)}{v_{pd}(t_4) - v_{pd}(t_7)} \right|, \quad (1)$$

where $v_{pd}(t_5)$ is the reset voltage at time, $t_5$, after the maximum nonsaturating input signal was collected by the photodiode 112, $V_{pd}(t_7)$ is the reset voltage at time $t_7$ after only dark current was collected by the photodiode 112, and $v_{pd}(t_4)$ is the minimum nonsaturating voltage at the photodiode 112. By assuming that the transistor 108 turns off at $t_2$, the small signal model in FIG. 4A can be used to estimate lag. This assumption is valid when the loop time constant $\tau<<(t_3-t_2)$. In addition, it is assumed that while transistor 122 is on, the resistance between nodes $v_1$ and $v_2$ is small, e.g., $v_1 \approx v_2$, and $C_f = C_{f1} + C_{f2}$.

Figure 4A:
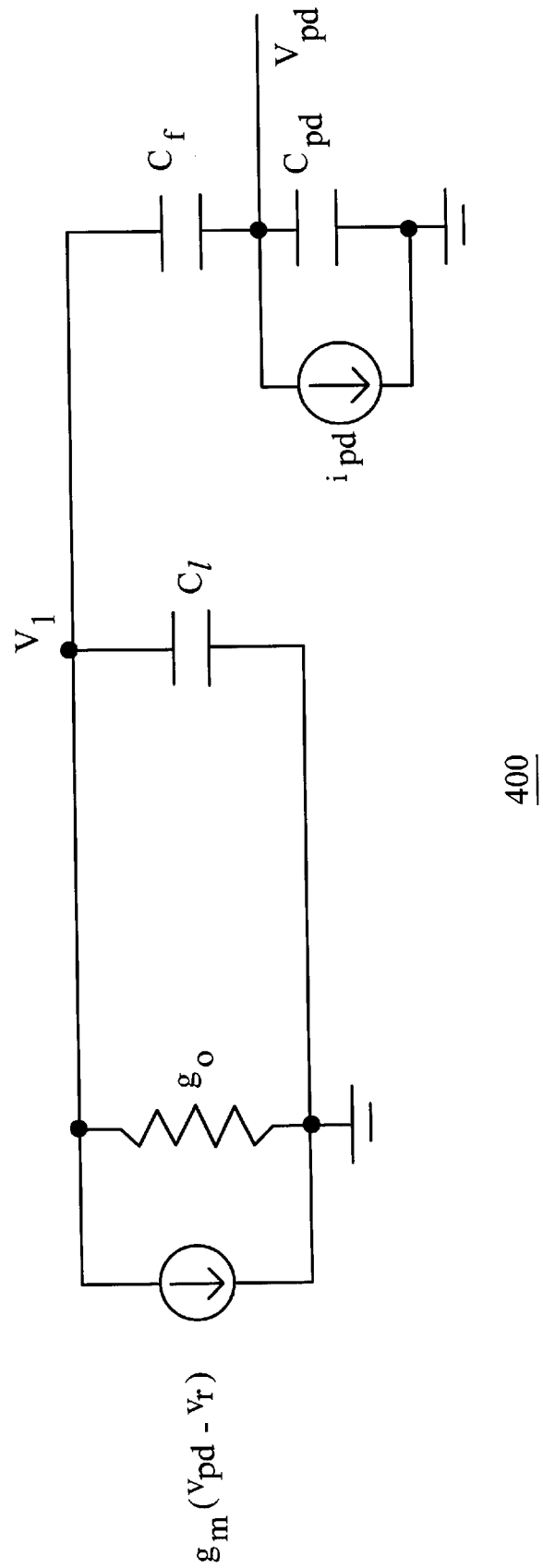
FIG. 4A is a schematic illustrating a small signal model for the APS circuit in FIG. 1 at time $t_3$.

Referring to FIG. 4A, there is shown a circuit schematic illustrating the small signal model for the reset circuit 102 in FIG. 1. Equations (2) and (3) describe the small signal model, where $g_m$ is the transconductance of the reset amplifier 106, $g_o$ is the output conductance of the reset amplifier 106, $C_l$ is the output capacitance of the reset amplifier 106, $C_f$ is the gate to source overlap capacitance of the transistor 108, $C_{pd}$ is the capacitance of the photodiode 112, and $i_{pd}$ is the current in photodiode 112.

$$(C_l + C_f)\frac{dv_1}{dt} - C_f \frac{dv_{pd}}{dt} = -g_0 v_1 - g_m v_{pd} + g_m v_r \quad (2)$$

$$(C_{pd} + C_f)\frac{dv_{pd}}{dt} - C_f \frac{dv_1}{dt} = -i_{pd} \quad (3)$$

Solving the above equations gives $$v_{pd}(t) = k_1 e^{-\frac{t}{\tau}} + k_2 + k_3 t, \quad (4)$$

$$v_1(t) = k_4 e^{-\frac{t}{\tau}} + k_5 + k_6 t, \quad (5)$$

where $\tau$, $k_1$, $k_2$, $k_3$, $k_4$, $k_5$, and $k_6$ are given in appendix A. If $(t_3-t_2)>>\tau$, then the following approximation can be made $$v_{pd}(t) \approx k_2 + k_3 t, \quad (6)$$

$$v_1(t) \approx k_5 + k_6 t, \quad (7)$$

Assuming that $v_{pd}(t2)$ and $v_1(t2)$ are independent of $i_{pd}$, then $$\max(lag) \approx \left| \frac{k_7 + k_8(t_3 - t_2)}{v_{pd}(t_4) - v_{pd}(t_7)} \right|, \quad (8)$$

where $k_7$ and $k_8$ are given in Appendix A. Using values $C_{pd}$=28.6 fF, $C_f$=0.2 fF, $C_l$=18 fF, $g_m$=7.7 μS, $g_o$=34.8 nS, $i_{pd}(t_7)$=10 fA, $i_{pd}(t_5)$=2.86 pA, $(t_3-t_2)$=10 μs, and $v_{pd}(t_4)-v_{pd}(t_7)$=−1V, we find that max(lag)=0.05%.

Reset Noise Analysis

Figure 4B:
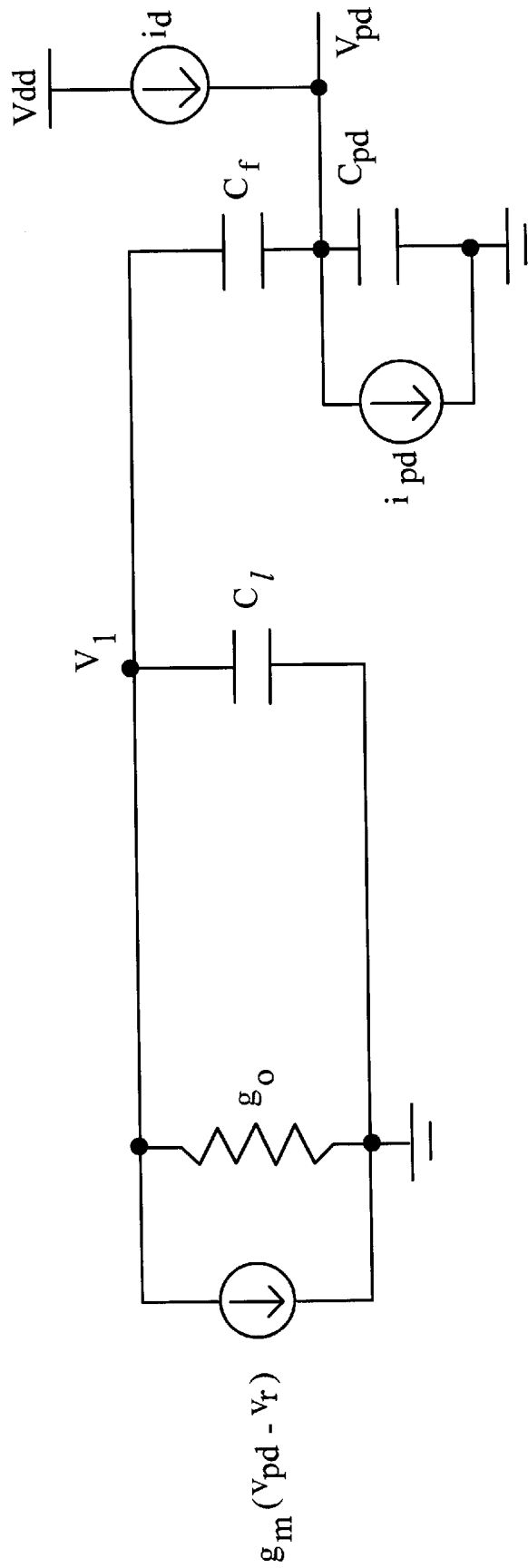
FIG. 4B is a schematic illustrating a small signal model for the APS circuit in FIG. 1 at time $t_2$.
Figure 4C:
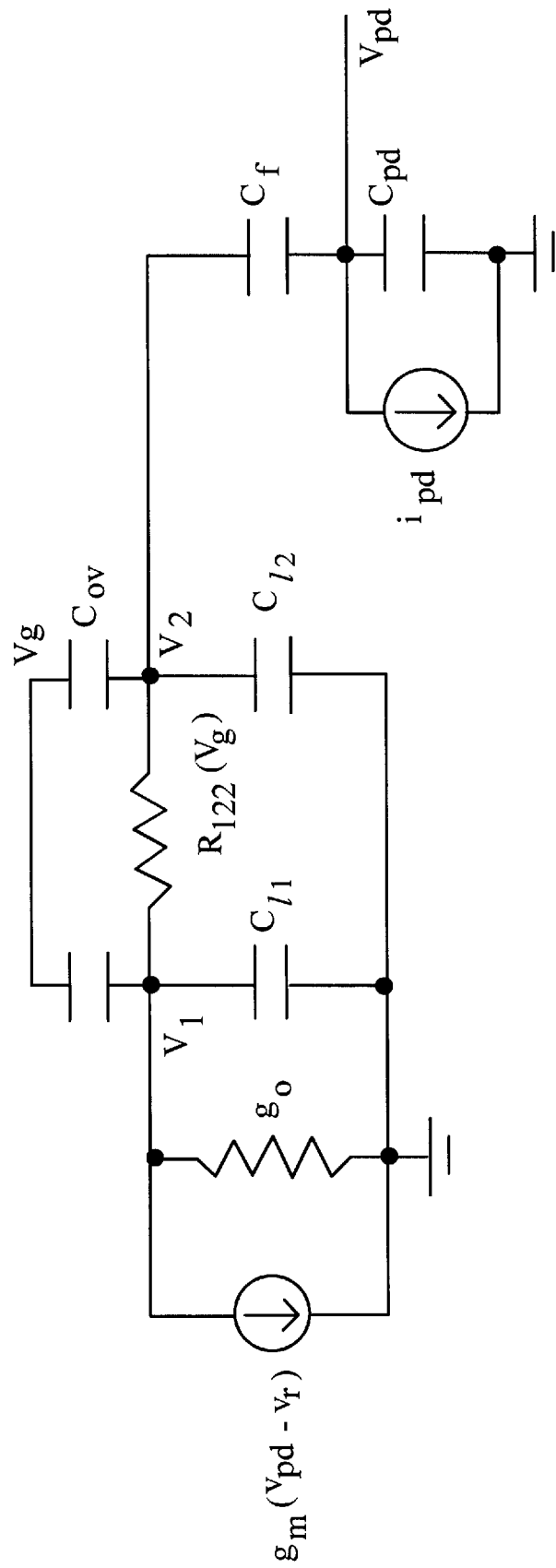
FIG. 4C is a schematic illustrating a small signal model for the APS circuit in FIG. 1 as the voltage $v_g$ falls.

The noise sampled onto the photodiode 112 at time $t_3$ is the sum of the noise sampled onto the photodiode 112 at time $t_2$ attenuated by the reset control loop, plus the noise of the reset amplifier 106, plus the noise sampled onto $C_{f2}$ and the noise on the overlap capacitance of transistor 122 attenuated by the capacitive voltage divider $$\frac{C_f}{C_{pd} + C_f},$$

as shown in FIG. 4C.

To determine the reset noise, the noise sampled on the photodiode 112 at times $t_2$ and $t_3$ is analyzed. At time $t_2$, noise is sampled onto the photodiode 112 when transistor 108 turns off. The noise sampled onto the photodiode 112 can be determined using the small signal model in FIG. 4B. To simplify the analysis the following notation is introduced: $V_{pd}=v_{pd}+V_n$, $I_d=i_d+I_{dn}$, $V_r=v_r+V_{rn}$, where $v_{pd}$ is the diode signal voltage, $V_n$ is the diode noise voltage, $i_d$ is the drain current in transistor 108, $I_{dn}$ is the noise current in $i_d$, $v_r$ is the reset voltage, and $V_{rn}$ is the input referred reset amplifier 106 noise voltage. Assuming the circuit is in a steady state at $t_2$, the noise power across the photodiode 112 is the sum of thermal noise from the reset amplifier 106 and shot noise from transistor 108. Shot noise from the photodiode 112 and thermal noise from the transistor 122 are small and can be neglected. The input referred two sided power spectral density of the thermal noise in the reset amplifier 106 is given by $$S_{v_m}(f) = \frac{\alpha 2kT}{g_m} V^2 / Hz, \quad (9)$$

where $\alpha$ is a constant that depends on the amplifier design (it is typically between ⅔ and 2), k is Boltzmann's constant, and T is temperature in Kelvin. The two-sided power spectral density of the shot noise in the transistor 108 is given by $$S_{I_{dn}}(f) = \frac{q i_{pd} A^2}{Hz}, \quad (10)$$

where q is the charge on the electron. See, e.g., A. Van der Ziel, "Noise in Solid State Devices," Wiley, New York, 1986, for more discussion related to equations (8) and (9).

The noise power of $V_n$ is given by:

$$\sigma^2_{v_n}(t2) = \int_{-\infty}^{\infty} S_{v_m}(f) \left| \frac{v_{pd}}{v_r}(f) \right|^2 + S_{I_{dn}}(f) \left| \frac{v_{pd}}{i_d}(f) \right|^2 df, \quad (11)$$

where $i_d = g_{m_l}(v_2 - v_{pd}) - g_{mb_l} v_{pd}$, and $g_{m_l}$ is the gate-to-source transconductance of transistor 108 and $g_{mb_l}$ is the source-to-body transconductance of transistor 108. The terms $$\frac{v_{pd}}{v_r}(f) \text{ and } \frac{v_{pd}}{i_d}(f)$$

are given in Appendix A.

Assuming that transistor 108 turns off at time $t_2$ and the reset control loop is in steady state at time $t_3$, the small signal model in FIG. 4A can be used for noise analysis. The total sampled noise at time $t_3$ is the sum of the thermal noise contributed by the reset amplifier 106 and the noise sampled on $v_2$ when $v_g$ falls. The shot noise contributed by the photodiode current is small and can be neglected. The noise contributed to $V_{pd}$ by the reset amplifier is $$\sigma^2_{ramp}(t3) = \int_{-\infty}^{\infty} S_{v_m}(f) \left| \frac{v_{pd}}{v_r}(f) \right|^2 df, \text{ and} \quad (12)$$

-continued $$\frac{v_{pd}}{v_r}(f) = \frac{g_m}{a + j2\pi f b}, \quad (13)$$

where a and b are given in Appendix A. Evaluating the integral gives $$\sigma_{ramp}^2(t3) = \frac{\alpha kTg_m}{ab}. \quad (14)$$

Using the model in FIG. 4C, and assuming $v_g$ falls much faster than the time constant of the reset control loop, then the noise power contributed by transistor 122 to $V_n$ is:

$$\sigma_{122}^2(t3) = \frac{kT}{C_{l2} + C_{ov} + \frac{C_{pd}C_f}{C_{pd} + C_f}} \left(\frac{C_f}{C_{pd} + C_f}\right)^2 + \quad (15)$$

$$\sigma^2 v_n(t2) \left( \frac{C_{ov}g_m}{\left(C_{ov} + C_{l2} + \frac{C_{pd}C_f}{C_{pd} + C_f}\right)a} \right)^2,$$

where $C_{ov}$ is the overlap capacitance of transistor 122. The first term in equation (15) is thermal noise from transistor 122 sampled onto $C_{l2}$ and $C_{ov}$ after transistor 122 turns off, and the second term in equation (15) is noise transferred from $C_{pd}$ to $C_{ov}$ via the reset control loop between time $t_2$ and time $t_3$ (see equation 5). The total noise sampled onto the photodiode 112 at time $t_3$ is:

$$\sigma_{v_{pd}}^2(t3) + \sigma_{ramp}^2(t3) + \sigma_{122}^2(t3) + \sigma_{v_n}^2(t2)\left(\frac{g_0(C_{pd} + C_f)}{C_f a}\right)^2 \quad (16)$$

The final term in equation (16) is the noise sampled on the photodiode 112 at $t_2$ attenuated by the reset control loop (see equation 4).

By appropriately selecting the gain of the reset amplifier 106, $$\frac{g_m}{g_0},$$

the overlap capacitance of transistor 108, $C_f$, and the bandlimiting capacitance, $C_{l1}$ and $C_{l2}$, pixel reset noise will be much lower than $$\frac{kT}{C_{pd}}.$$

This reduction in reset noise is achieved by turning off transistor 108, bandlimiting the reset amplifier 106, and controlling the reset control loop via a capacitive voltage divider. Again using values of $C_{pd}$=28.6 fF, $C_f$=0.2 fF, $C_{l1}$=6 fF, $C_{l2}$=12 fF, $g_m$=7.7 μS, $g_o$=34.8 nS, α=1, $i_{pd}(t_3)$=10 fF, T=300K, $(t_2-t_1)$=10 μS, and $(t_3-t_2)$=10 μS, $\sigma^2_{v_{pd}}$=7.9 nV² ,i.e., 15.9 electrons RMS. If $g_o$ is reduced to 1.4 nS and $C_{l2}$ is increased to 50 fF $\sigma^2_{v_{pd}}$=600 pV², i.e., 4.4 electrons RMS.

Figure 5:
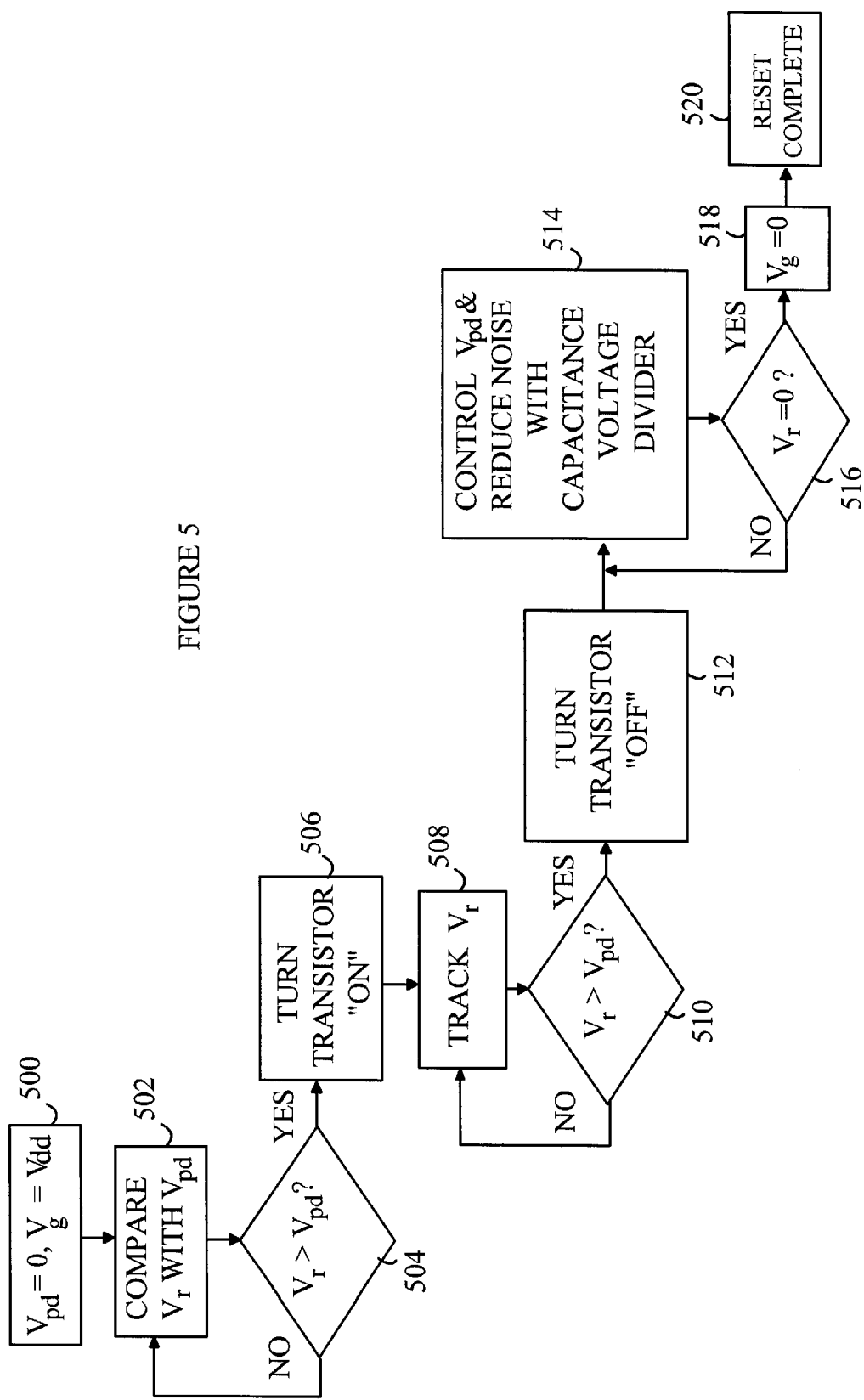
FIG. 5 is a flow diagram of the method steps for resetting a pixel device using the APS circuit in FIG. 1.

Referring to FIG. 5, there is shown a flow diagram of the method steps for resetting the photodiode 112 using the reset circuit 102 described with respect to FIGS. 1 and 2. The method begins when the voltage $v_g$ rises to a voltage $v_{dd}$ and a voltage $v_{pd}$ is pulled to ground 500, or any other suitable reference voltage. The reset amplifier 106 compares 502 the reset voltage, $v_r$, with the voltage, $v_{pd}$, at the readout node 110. If $v_r$ exceeds 504 $v_{pd}$, then the transistor 108 is turned on 506. After the transistor 108 is turned on 506, $v_{pd}$ tracks 508 $v_r$. The tracking 508 continues until vpd exceeds 510 $v_r$, at which time transistor 108 is turned off 512. If the transistor 108 is turned off 512, $v_{pd}$ is controlled 514 by overlap capacitance of the reset amplifier 106 and pixel reset noise is reduced at the readout node 110 by a capacitive voltage divider, including the gate to source overlap capacitance of the reset amplifier 106 and the capacitance of the photodiode 112. When $v_r$ and $v_g$ are equal to ground 516, or any other suitable reference, the reset circuit 102 completes 518 its operation.

Other Embodiments

Figure 6:
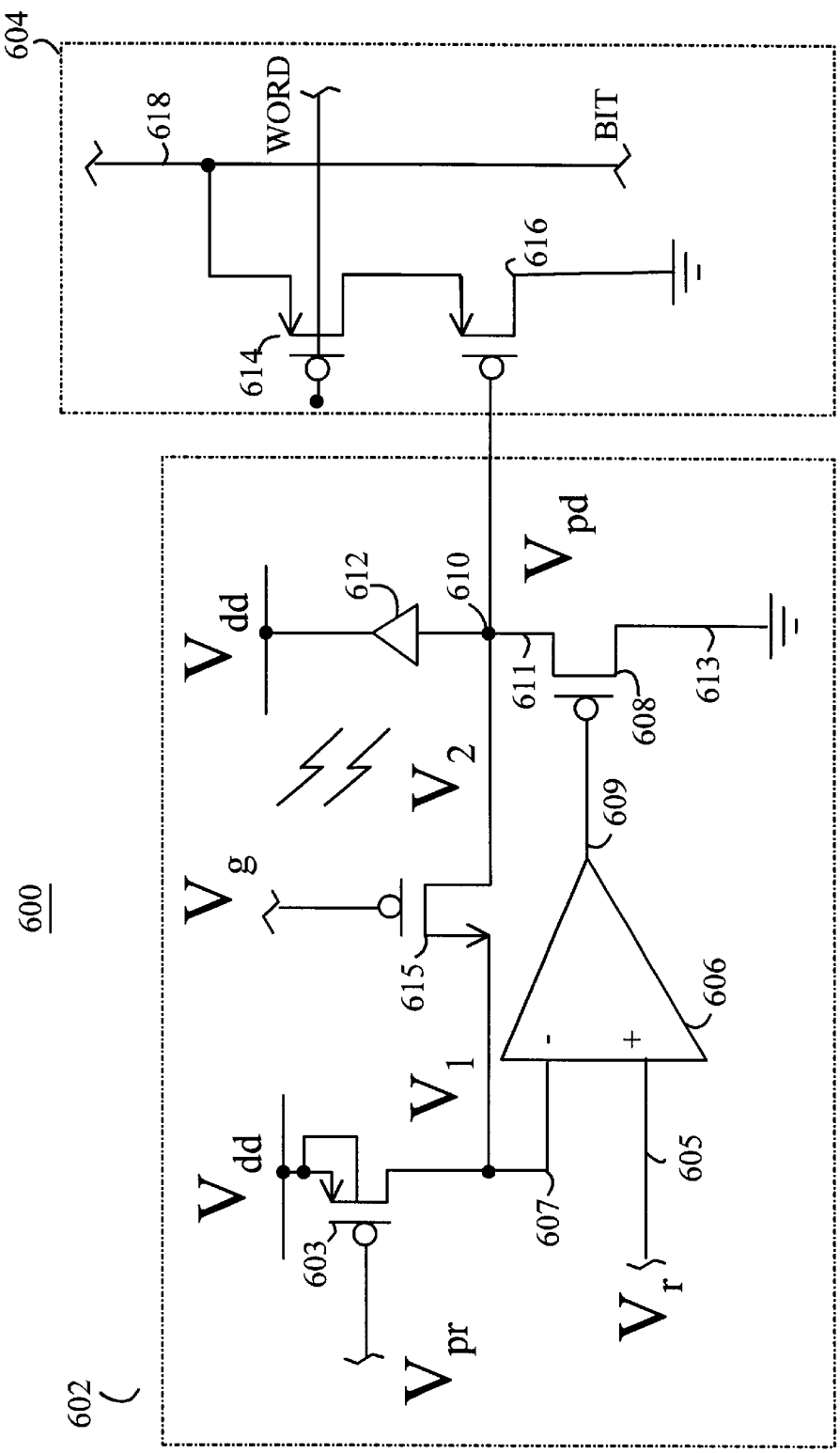
FIG. 6 is a schematic of another embodiment of an APS circuit in accordance with the present invention.

Referring to FIG. 6, there is shown a schematic of an APS 600 circuit in accordance with the present invention. The APS 600 includes two circuits: a reset circuit 602 and a readout circuit 604. The readout circuit 604 is similar to the readout circuit 104 already described with respect to FIG. 1, and therefore will not be discussed.

The reset circuit 602 includes a compare module 606 and a switch 608 coupled together in a closed-loop feedback arrangement ("reset control loop"). In this embodiment, the compare module 606 is a differential amplifier (e.g., 741 op-amp) and the switch 608 is an NMOS transistor.

The compare module 606 has at least two inputs and an output. A first input 605 is coupled to a reset voltage, $v_r$, for resetting pixel device 612. The reset voltage, $v_r$, can be derived from a source internal or external to the APS 600. Alternatively, the pixel device 612 can be reset using a signal other than a voltage level (e.g., current level, phase change). A second input 607 to the compare module 606 is coupled to the readout node 610 to provide a closed-loop feedback path for the reset circuit 602. In this embodiment, the compare module 606 provides an output voltage, $v_2$, in response to a difference in voltage levels applied to the first and second inputs 605, 607 of the compare module 606.

The switch 608 has at least three terminals. A first terminal 609 is coupled to the output of the compare module 606. A second terminal 611 is coupled to the readout node 610 and the pixel device 612 to complete the feedback loop to the compare module 606 via transistor 615. A third terminal 613 is coupled to a references source, $v_{ss}$, typically zero voltage or ground, as shown in FIG. 6. The power source, $v_{dd}$, is coupled to the pixel device 612 and can be located internal or external to the APS 600 depending on the application.

The operation of the reset circuit 602 in APS 600 is similar to the operation of reset circuit 102, previously described with respect to FIG. 1, and therefore will not be discussed.

Figure 7:
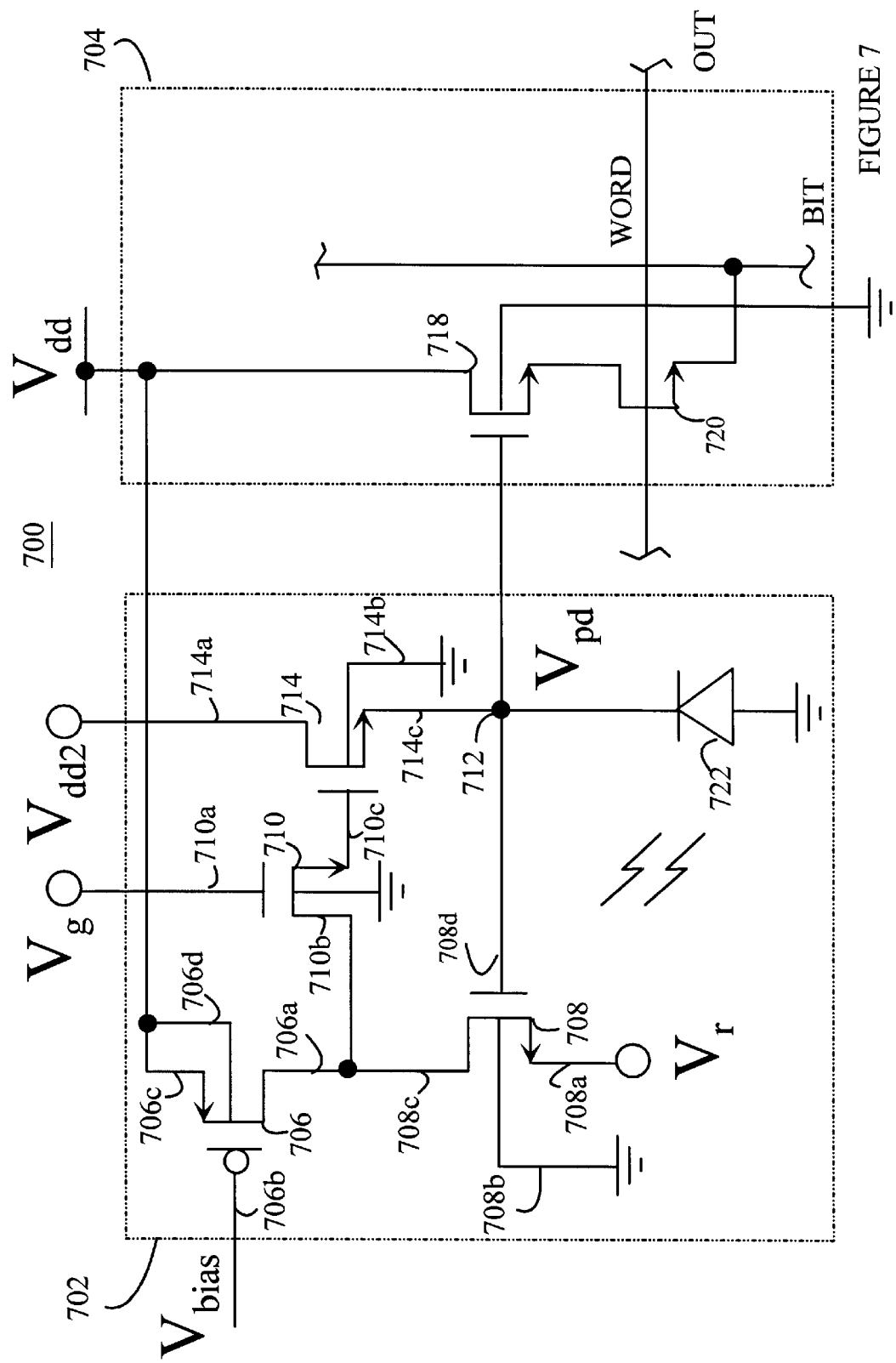
FIG. 7 is a schematic of a six transistor APS circuit in accordance with the present invention.

Referring to FIG. 7, there is shown a schematic of a six transistor APS 700 circuit in accordance with the present invention. Similar to the previously described embodiments, the APS 700 includes two circuits: a reset circuit 702 and a readout circuit 704. The readout circuit 704 is similar to the readout circuit 104 already described with respect to FIG. 1, and therefore will not be discussed.

Transistors 706, 708 are coupled to provide a function similar to the reset amplifier 106 shown in FIG. 1. Terminal 706a of transistor 706 is coupled to terminal 708c of transistor 708 and terminal 710b of transistor 710 for resetting pixel device 722. Terminals 706c and 706d of transistor 706 are coupled to power source, $v_{dd}$, for providing power to APS 700. Terminal 706b is coupled to a voltage bias, $v_{bias}$, for biasing the transistor 706. Terminal 708a of transistor 708 is coupled to a reset voltage, $v_r$, as described with respect to FIG. 1. Terminal 708b is coupled to ground.

Terminals 706a, 708c, are all coupled to terminal 710b of transistor 710. Transistor 710 provides output capacitance, $C_l$, for transistors 706, 708, when transistor 710 is on. The output capacitance, $C_l$, is similar to the output capacitance, $C_l$, of the reset amplifier 106, previously described with respect to FIG. 1. Terminal 710a is coupled to voltage, $v_g$. Transistor 710 is coupled to transistor 714 via terminal 710c.

Terminal 714c of transistor 714 is coupled to readout node 712. Terminal 714a of transistor 714 is coupled to power source, $v_{dd2}$. Terminal 714b of transistor 714 is coupled to ground. Transistor 714 functions as a switch for resetting pixel device 722, as previously described with respect to switch 108 in FIG. 1.

The reference node 712 is coupled to transistor 718 of the readout circuit 704, and to terminal 708d of transistor 708 for providing a feedback path to transistor 708. The reference node 712 is also coupled to pixel device 722.

The operation of the reset circuit 702 in APS 700 is similar to the operation of reset circuit 102, previously described with respect to FIG. 1, and therefore will not be discussed.

The foregoing description of the embodiments of the invention has been presented for the purposes of illustration and description. It is not intended to be exhaustive or to limit the invention to the precise form disclosed. Many modifications and variations are possible in light of the above teaching. For example, an external reset mechanism may be added to the foregoing embodiments of the reset circuit of the present invention for resetting the pixel from an external source. Thus, it is intended that the scope of the invention be limited not by this detailed description, but rather by the claims appended hereto.

APPENDIX A. EQUATION CONSTANTS $$a = g_0 \frac{C_{pd} + C_f}{C_f} + g_m \tag{17}$$

$$b = \frac{C_l C_f + C_{pd} C_f + C_l C_{pd}}{C_f} \tag{18}$$

$$k_1 = v_{pd}(0) - k_2 \tag{19}$$

$$k_2 = \frac{v_r g_m - \frac{C_l + C_f}{C_f} i_{pd} + v_{pd}(0) \frac{C_{pd} + C_f}{C_f} g_0}{a} + \frac{\frac{i_{pd} g_0}{C_f}}{a^2} - \frac{v_1(0) g_0}{a} \tag{20}$$

$$k_3 = \frac{-i_{pd} g_0}{C_f a} \tag{21}$$

$$\tau = \frac{b}{a} \tag{22}$$

$$k_4 = v_1(0) - k_5 \tag{23}$$

$$k_6 = -\frac{v_1(0) g_m}{a} - v_{pd}(0) \frac{g_m(C_{pd} + C_f)}{C_f a} + \frac{v_r g_m(C_{pd} + C_f)}{C_f a} - \frac{i_{pd} g_m b}{C_f a^2} - \frac{i_{pd}}{a} \tag{24}$$

$$k_6 = \frac{i_d g_m}{C_f a} \tag{25}$$

$$k_7 = \frac{g_0 b(i_{pd}(t5) - i_{pd}(t7))}{C_f a^2} - \frac{\frac{C_l + C_f}{C_f}(i_{pd}(t5) - i_{pd}(t7))}{a} + \frac{g_m b(i_{pd}(t5) - i_{pd}(t7))}{C_f a^2} k_{11} + \frac{i_{pd}(t5) - i_{pd}(t7)}{a} k_{11} \tag{26}$$

$$k_8 = \frac{-(i_{pd}(t5) - i_{pd}(t7)) g_0}{C_f a} - \frac{g_m(i_{pd}(t5) - i_{pd}(t7))}{C_f a} k_{11} \tag{27}$$

$$k_9 = \frac{g_0}{a} \tag{28}$$

$$k_{10} = 1 + \frac{C_{pd}}{C_f} - \frac{g_0 b}{C_f a} \tag{29}$$

$$k_{11} = \frac{C_{cov} C_f}{\left(C_{cov} + C_{l2} + \frac{C_{pd} C_f}{C_{pd} + C_f}\right)(C_{pd} + C_f)} \tag{30}$$

$$k_{12} = C_l C_f + C_{pd} C_f + C_l C_{pd} \tag{31}$$

$$k_{13} = g_o(C_{pd} + C_f) + g_{m_l} C_f + g_{mb_l}(C_l + C_f) + g_m C_f \tag{32}$$

$$k_{14} = g_{m_l}(g_m + g_o) + g_o g_{mb_l} \tag{33}$$

$$\frac{v_{pd}}{v_r}(f) = \frac{j2\pi f C_f + g_{m_i}}{(j2\pi f)^2 k_{12} + j2\pi f k_{13} + k_{14}} \tag{34}$$

$$\frac{v_{pd}}{v_{id}}(f) = \frac{j2\pi f(C_l + C_f) + g_0}{(j2\pi f)^2 k_{12} + j2\pi f k_{13} + k_{14}} \tag{35}$$

What is claimed is:

1. A method of providing low noise readout from a pixel device in an image sensor, wherein the image sensor includes a reset circuit having a reset control loop for controlling the reset of the pixel device, the reset control loop including a compare module and a switch, the compare module having a first input for receiving a reset signal and a second input for receiving a feedback signal from a readout node, the readout node being coupled to outputs of the switch and pixel device, the readout node having a readout signal thereon, respectively, the method comprising the steps of:

(a) comparing the reset signal with the feedback signal;

(b) turning the switch on and off in response to a difference detected between the reset signal and the feedback signal; and (c) controlling the reset control loop with capacitance in the reset control loop in response to the switch turning off, wherein the feedback signal reduces noise at the readout node.

2. The method of claim 1, wherein step (c) includes coupling overlap capacitance of the compare module and a pixel device capacitance to provide a capacitive voltage divider for reducing noise at the readout node.

3. The method of claim 1, wherein the switch is turned on in response to the reset signal exceeding the readout signal and the switch is turned off in response to the readout signal exceeding the reset signal.

4. The method of claim 1, further including the step of bandlimiting the output of the compare module so as to further reduce noise at the readout node.

5. The method of claim 1, wherein the reset signal transitions from a first voltage level at a first time to a second voltage level at a later time at a predetermined transition rate.

6. A method of providing low noise readout from a pixel device in an image sensor, wherein the image sensor includes a reset circuit having a reset control loop for controlling the reset of the pixel device, the reset control loop including a compare module and a switch, the compare module having a first input for receiving a reset signal and a second input for receiving a feedback signal from a readout node, the readout node being coupled to outputs of the switch and pixel device, the readout node having a readout signal thereon, respectively, the method comprising the steps of:

(a) comparing the reset signal with the feedback signal;

(b) turning the switch on and off in response to a difference detected between the reset signal and the feedback signal; and (c) controlling the reset control loop with capacitance in the reset control loop in response to the switch turning off, wherein the feedback signal reduces noise at the readout node, wherein the reset signal transitions from a first voltage level at a first time to a second voltage level at a later time at a predetermined transition rate, and wherein the reset signal transitions at a rate in the range of about $0.1V/\mu s$ to about $2V/\mu s$.

7. A circuit for resetting a pixel device, comprising:

a switch, coupled to a readout node characterized by a readout voltage, for resetting the pixel device, the readout node providing a feedback signal; and a compare module coupled to the switch, the feedback signal, and a reset signal, the compare module turning the switch on and off in response to a difference detected between the feedback signal and the reset signal, wherein the feedback signal reduces noise at the readout node, wherein the compare module includes at least one amplifier having a plurality of inputs and an output, the amplifier having a first input coupled to a first voltage source for receiving a reset voltage and a second input coupled to the readout node for receiving a readout voltage, and wherein the switch includes at least one transistor having a plurality of terminals, the transistor having a first terminal coupled to the output of the amplifier for turning the transistor on and off in response to the difference detected between the readout voltage and the reset voltage and a second terminal coupled to the readout node for resetting the pixel device.

8. A circuit for resetting a pixel device, comprising:

a switch, coupled to a readout node characterized by a readout voltage, for resetting the pixel device, the readout node providing a feedback signal; and a compare module coupled to the switch, the feedback signal, and a reset signal, the compare module turning the switch on and off in response to a difference detected between the feedback signal and the reset signal, wherein the feedback signal reduces noise at the readout node and, wherein the compare module is bandlimited so as to further reduce noise at the readout node.

9. A circuit for resetting a pixel device, comprising:

a switch, coupled to a readout node characterized by a readout voltage, for resetting the pixel device, the readout node providing a feedback signal; and a compare module coupled to the switch, the feedback signal, and a reset signal, the compare module turning the switch on and off in response to a difference detected between the feedback signal and the reset signal, wherein the feedback signal reduces noise at the readout node, wherein the overlap capacitance of the compare module and a pixel device capacitance are coupled to the feedback signal for providing a capacitive voltage divider for reducing noise at the readout node.

10. The circuit of claim 7, wherein the transistor can only pull voltage up.

11. A circuit for resetting a pixel device, comprising:

a switch, coupled to a readout node characterized by a readout voltage, for resetting the pixel device, the readout node providing a feedback signal;

a compare module coupled to the switch, the feedback signal, and a reset signal, the compare module turning the switch on and off in response to a difference detected between the feedback signal and the reset signal, wherein the feedback signal reduces noise at the readout node, and a second switch for isolating the input of the switch coupled to the readout node and the output of the compare module.

12. A circuit for resetting a pixel device, comprising:

a switch having at least two terminals, the first terminal of the switch coupled to the pixel device and a readout node for providing a readout node voltage;

a compare module having an output coupled to the second terminal of the switch for providing an output voltage for controlling the switch, the compare module having at least two inputs, the first input for receiving the readout node voltage and the second input for receiving a reset signal, the compare module for comparing the reset signal and the readout node voltage and for providing the output voltage in response to a difference between the readout node voltage and the reset signal, the readout node voltage coupled to a capacitive voltage divider for reducing noise at the readout node.

13. A circuit for resetting a pixel device, the circuit comprising;

a switch having at least two terminals, the first terminal of the switch coupled to the pixel device and a readout node for providing a readout node voltage;

a compare module having an output coupled to the second terminal of the switch for providing an output voltage for controlling the switch, the compare module having at least two inputs, the first input for receiving the readout node voltage and the second input for receiving a reset signal, the compare module comparing the reset signal and the readout node voltage and providing the output voltage in response to a difference between the readout node voltage and the reset signal, the readout node voltage coupled to a capacitive voltage divider for reducing noise at the readout node, wherein the readout node voltage is noise and is coupled to the capacitive voltage divider only when the pixel device is off.

* * * * *